S. L. MARSH.
SUPPORT FOR CUTTING TOOLS.
APPLICATION FILED JAN. 4, 1917.
1,289,219.
Patented Dec. 31, 1918.
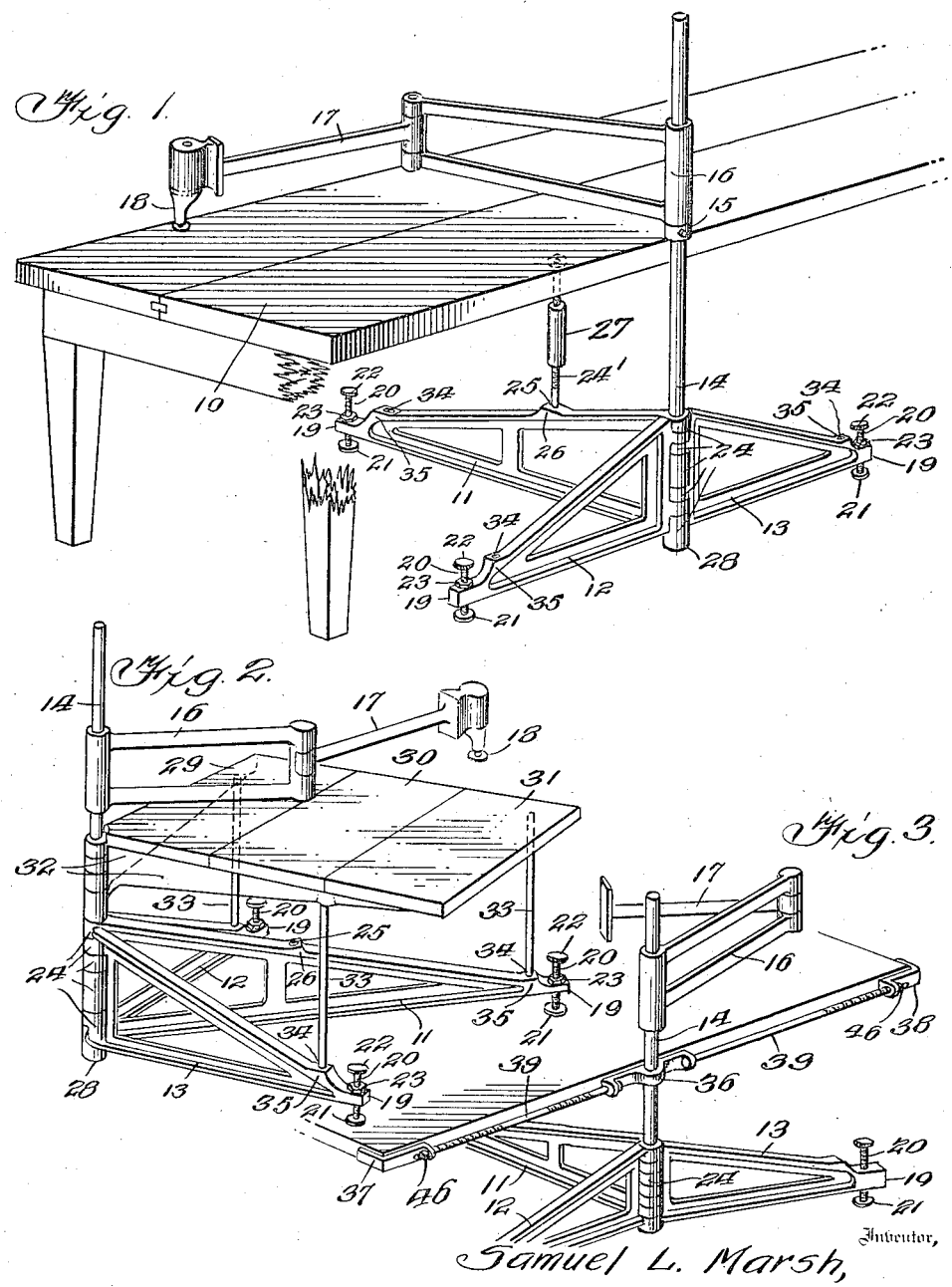
Samuel L. Marsh, Inventor

UNITED STATES PATENT OFFICE.

SAMUEL LEWIS MARSH, OF NEW YORK, N. Y.

SUPPORT FOR CUTTING-TOOLS.

1,289,219.  Specification of Letters Patent.  Patented Dec. 31, 1918.

Application filed January 4, 1917. Serial No. 140,638.

*To all whom it may concern:*

Be it known that I, SAMUEL LEWIS MARSH, a citizen of the United States, residing at New York city, in the county of New York and State of New York, have invented certain new and useful Improvements in Supports for Cutting-Tools, and do hereby declare the following to be a full, clear, and exact description of the invention, such as will enable others skilled in the art to which it appertains to make and use the same.

This invention relates to supports for surfacing machines, and more particularly to that type of machine which is used for facing cutting blocks and the like.

It has for an object, to provide a simple form of support which may be easily set up for use, and which may be easily adjusted to regulate the plane of operation of a cutter.

A further object of this invention is the provision of a support comprising a number of sections hingedly secured together which may be disposed with respect to each other as to present the best support for a movable cutter head carried thereby.

A further object of this invention is the provision of a base section comprising a number of sections hingedly secured together, a standard carried by said base section to support a cutting tool, means for adjusting said base section with respect to the flooring, and said base section serving as a support for a work table in certain uses of the tool support.

Further objects will be apparent from the following specification, appended claims, and drawings, in which:

Figure 1 is a perspective view of the support set up next to a cutting table,

Fig. 2 is a similar view showing the base used as a support for a demountable work table, and Fig. 3 shows the support anchored to a work table.

This invention permits a simplified form of support being formed to adjustably carry a movable cutting tool for truing the face of a cutting block or table.

It is intended for use with the devices commonly known as meat block leveling machines, and its object is to afford a support for the movable cutter which can be mounted upon the floor of a room where it can be anchored and which may be disposed in relation to cutting boards or blocks to which other fastening means cannot be attached. It also affords a support for a temporary work table upon which, the surfaces to be trued may be treated.

Referring to the drawings, in which the several features are clearly shown, 10 indicates a work table which may be very long, and which may be either in the form of a table or bench. A support comprising the base having the three leaves 11, 12 and 13 is placed on the floor so that the standard 14, carried by these leaves rises beside the edge of the table. This standard has a collar 15 adjustably carried thereby so that the frame 16 may be raised or lowered to properly position the arm 17, to which the driven cutter 18 is attached. When the base is properly adjusted to place the standard 14 in a vertical position, the frame 16 and arm 17 may be moved over the surface to be trued to cause the cutter 18 to trim the entire surface.

The leaves 11, 12 and 13 have their outer ends formed into heads 19, through which threaded passages are formed to receive the adjusting screws 20, which have the bearing plates 21 carried by the lower ends, and thumb nuts 22 formed on the upper ends, so that these screws may be adjusted. Lock nuts 23 may be placed on these screws to permit the base being maintained in the desired adjusted position. The leaves have knuckles 24 on their meeting ends, which are so formed and positioned as to interlock and receive the lower end of the standard 14 in the passages formed therein the standard serving as a pintle for these leaves. These leaves may be of the same length, but it is preferable that the leaf 11 be of greater length than the leaves 12 and 13, so that this leaf may be passed under the table as shown in Fig. 1, and when the support is used in connection with a heavy table or bench, the support may be clamped to the floor as by inserting a spacing rod 24' between the under face of the bench and the socket 25, formed in the step 26, on the upper edge of the leaf 11. This spacing rod may be formed of two sections, oppositely threaded which are held in the turn buckle 27, so that in the adjustment of the sections, the desired binding action may be had on the leaf 11. The inner end of the leaf 11 will preferably have a lug 28 formed thereon, which bears on the floor giving the base four points of contact with the floor.

As shown in Fig. 2, the leaves are arranged in a predetermined manner, and then a table formed of the sections 29, 30 and 31 is placed on the brackets 32 which are carried by the standard 14 in bearing relation on the upper knuckle of the leaf 11, and this table is supported over the end of each leaf as by the standards 33 which fit in sockets 34 formed in the steps 35 on the upper edges of the leaves 11, 12 and 13, and in sockets formed in the under face of the table sections or the brackets 32 substantially as shown. This table serves as a work bench for boards or the like which may be removed for resurfacing and in the use thereof, the standard rises above one corner to allow free movement of the cutter head over the entire table top.

In Fig. 3, the standard is shown clamped in upright position and has the socket member 26 placed against the edge of the table. Angle clamps 37 and 38 engage the ends of the table or bench and binding rods or cables 39 are attached to these clamps and to the binding nuts 46.

By the use of the several forms of support herein shown, it is possible to get to the surface of any table or block to dress the upper surface thereof without moving or molesting the block, and a portable surfacing machine is had.

Other modifications may be made without departing from the spirit of this invention, and no limitation is implied by the limited showing of the drawing which is for illustrative purposes only. It is also thought that the method of setting up and adjusting the support is clear in view of the foregoing, so no further description thereof is given.

Having thus described this invention, I claim:

1. A support of the class described, comprising a base, leaves hingedly secured together forming said base, a standard removably carried by said base, adjusting screws carried by said leaves for changing the elevation of said leaves, a table top over said leaves, and standards carried by said leaves attached to said table top.

2. A support of the class described comprising a base formed of a plurality of leaves, knuckles formed on said leaves having passages therein, said knuckles interlocking when said leaves are assembled, foot pieces carried by the remote ends of said leaves, a base formed on one leaf under the knuckles to support the meeting ends of said leaves when the remote ends are to one side of the meeting ends, and a standard carried by said base having its lower end disposed within the passage in said knuckles.

3. A support of the class described comprising a plurality of leaves, knuckles formed on the meeting ends thereof having registering passages formed therein, a tool supporting standard engaging in the registering pasages in said knuckles, a non-adjustable base under said knuckles and adjustable foot pieces carried by the remote ends of said leaves.

4. In a support of the class described, a supporting standard, and a base, said base comprising a number of leaves hingedly mounted for circumferential movement with respect to the axis of said standard and adjustable foot pieces carried by said leaves to permit of establishing a perpendicular disposition of said standard irrespective of the irregular flooring.

In testimony whereof I affix my signature.

SAMUEL LEWIS MARSH.

Copies of this patent may be obtained for five cents each, by addressing the "Commissioner of Patents, Washington, D. C."